United States Patent [19]
Moriguchi et al.

[11] Patent Number: 5,171,723
[45] Date of Patent: Dec. 15, 1992

[54] TOOL COMPRISED OF A SILICON NITRIDE SINTERED BODY

[75] Inventors: Hideki Moriguchi; Toshio Nomura; Mitsunori Kobayashi, all of Itami, Japan

[73] Assignee: Sumitomo Electric Industries, Ltd., Osaka, Japan

[21] Appl. No.: 687,696

[22] Filed: Apr. 19, 1991

[30] Foreign Application Priority Data

| Apr. 19, 1990 [JP] | Japan | 2-101556 |
| Apr. 19, 1990 [JP] | Japan | 2-101557 |
| Apr. 2, 1991 [JP] | Japan | 3-69895 |

[51] Int. Cl.$^5$ ............................................. C04B 35/58
[52] U.S. Cl. ......................................... 501/97; 501/98
[58] Field of Search .................................... 501/97, 98

[56] References Cited

U.S. PATENT DOCUMENTS 4,879,263 11/1989 Komeya et al. .................... 501/98
4,961,913 10/1990 Sullivan .............................. 501/95

FOREIGN PATENT DOCUMENTS 0231130 8/1987 European Pat. Off. .

Primary Examiner—Mark L. Bell
Assistant Examiner—Deborah Jones
Attorney, Agent, or Firm—Wenderoth, Lind & Ponack

[57] ABSTRACT

A tool comprised of a silicon nitride sintered body which is excellent in toughness as well as wear resistance can be provided in an economical manner. The novel feature of the tool is that the silicon nitride crystal grains comprise 50 to 90% by volume of hexagonal pillar crystals having a minor axis of at most 1.0 μm and 5 to 30% by volume of hexagonal pillar or columnar crystals having a minor axis of at least 1.5 μm. As the silicon nitride starting powder, there is preferably used a mixture of at least two silicon nitride powders prepared by the imide decomposition method, direct metallic silicon nitriding method and silica reducing method.

3 Claims, No Drawings

TOOL COMPRISED OF A SILICON NITRIDE SINTERED BODY

BACKGROUND OF THE INVENTION

1. Field of the Invention

This invention relates to a tool comprised of a silicon nitride sintered body having a good wear resistance as well as excellent toughness, which is particularly useful in the field of cutting tools or wear resistance tools.

2. Description of the Prior Art

Up to the present time, in the field of art relating to tool parts comprised of sintered aluminum oxides, it has been proposed to increase the transverse rupture strength and improve the wear resistance characteristics of such tools by rendering the crystal grain size of the sintered body as small as possible and by simultaneously reducing the grain size distribution. Specifically, this proposal has been carried out by adding a sintering aid capable of lowering the sintering temperature, e.g. NiO, $ZrO_2$, or $Y_2O_3$, or by adding a sintering aid capable of suppressing the grain growth itself, e.g. TiC.

Increasing the transverse rupture strength and improving the wear resistance by rendering the crystal grain size of the sintered body as small as possible and by reducing the grain size distribution is also an effective means for improving the transverse rupture strength as well as the wear resistance of sintered silicon nitrides. Thus, some techniques have been developed to accomplish this object, for example, synthesis of fine grain high $\alpha$-silicon nitride powder for the purpose of forming uniform nuclei of $\beta$-silicon nitride in the transformation of $\alpha \rightarrow \beta$, optimization of the sintering curves, uniform mixing of a sintering aid such as $Y_2O_3$, etc.

As a result of these efforts, silicon nitride sintered bodies have been employed as a tool material in the fields of cutting and machining cast iron, in which aluminum oxide sintered bodies are hardly used, for example, in the field of rough cutting cast iron.

As described above, the method comprising rendering the crystal grain size of the sintered body as small as possible and reducing the grain size distribution, thereby improving the transverse rupture strength as well as the wear resistance, is effective and has increasingly been used in the field of rough cutting cast iron, in which aluminum oxide sintered bodies are difficult to use. However, it is found by the inventors that when a silicon nitride sintered body is actually subjected to cutting of cast iron, wear of the silicon nitride sintered body proceeds rapidly by wear of the crystal grains through abrasion due to the presence of a very hardened layer (chilled layer) on the surface of the cast iron or due to the so-called "sand-containing" phenomenon. That is, it is apparent that there is a limitation for improving the transverse rupture strength and the wear resistance of a sintered silicon nitride tool by the method comprising rendering the crystal grain size of the sintered body as small as possible and reducing the grain size distribution.

SUMMARY OF THE INVENTION

It is an object of the present invention to provide a tool comprised of a silicon sintered body capable of exhibiting an excellent toughness and wear resistance in practical use.

It is another object of the present invention to provide a tool comprised of a silicon carbide sintered body having a more lengthened life as compared with the prior art tools comprised of a silicon carbide sintered body consisting of only fine crystal grains.

These objects can be attained by a tool comprised of a silicon nitride sintered body in which the crystal grain comprise 50 to 90 % by volume of hexagonal pillar crystals having a minor axis of at most 1.0 μm and 5 to 30 % by volume of hexagonal pillar crystals having a minor axis of at least 1.5 μm.

DETAILED DESCRIPTION OF THE INVENTION

The inventors have made various efforts to improve the wear resistance of a tool comprised of a silicon nitride sintered body and, consequently, have found that both the toughness and wear resistance characteristics of such tools can be improved without inconsistency by not only rendering fine the crystal grains of the silicon nitride sintered body, but also by making a mixed structure of fine grains and coarse grains. The present invention is based on this finding.

Accordingly, the present invention provides a tool comprised of a sintered silicon nitride body in which the crystal grains comprise 50 to 90% by volume of hexagonal pillar crystals having a minor axis of at most 1.0 μm and 5 to 30% by volume of hexagonal pillar crystals having a minor axis of at least 1.5 μm.

In a preferred embodiment of the tool comprised of a silicon nitride sintered body or compact according to the present invention, the tool contains 1 to 10% by weight of $Al_2O_3$ and 1 to 10% by weight of $Y_2O_3$ as a sintering aid.

Furthermore, the present invention provides a process for the production of a tool comprised of a sintered silicon nitride body in which the crystal grains comprise 50 to 90% by volume of hexagonal pillar crystals having a minor axis of at most 1.0 μm and 5 to 30% by volume of hexagonal pillar crystals having a minor axis of at least 1.5 μm. The process comprises using a silicon nitride powder prepared by imide decomposition method, direct silicon nitriding method or silica reducing method as a raw material, optionally mixing the raw material with 1 to 10% by weight of $Al_2O_3$ and 1 to 10% by weight of $Y_2O_3$ as a sintering aid, pulverizing the resulting product, subjecting the product to press molding and then subjecting the resulting molded article to sintering in a nitrogen atmosphere at a pressure of 1 to 300 atm and at a temperature of 1700° to 1900 ° C., or further subjecting the product after the sintering to HIP treatment at a temperature of 1600° to 1900 ° C. and at a nitrogen gas pressure of 10 to 3000 atm. As the imide, there is for example used $Si(NH_3)_2$.

In a preferred embodiment of the present invention, the above described tool comprised of a sintered silicon nitride body can be produced by using raw material nitride powders prepared by at least two kinds of imide decomposition methods, direct silicon nitriding methods and silica reducing methods, optionally mixing these powders with 1 to 10% by weight of $Al_2O_3$ and 1 to 10% by weight of $Y_2O_3$ as a sintering aid, pulverizing the resulting product, subjecting the product to press molding and then subjecting the resulting molded article to sintering in a nitrogen atmosphere at a pressure of 1 to 300 atm and a temperature of 1700° to 1900 ° C., or further subjecting the product after the sintering to HIP treatment at a temperature of 1600° to 1900 ° C. and a nitrogen gas pressure of 10 to 3000 atm.

The present invention will now be illustrated in more detail by describing some preferred embodiments of the present invention.

In the development of materials for silicon nitride sintered tools, it has been tried to increase the transverse rupture strength and improve the wear resistance characteristics of such tools by rendering the crystal grain size of the sintered body as small as possible and by reducing the grain size distribution. However, it is generally known in ceramic sintered bodies or compacts that the smaller the grain size of crystal grains composing the matrix, the more increased the transverse rupture strength of the sintered bodies or compacts, but the smaller the fracture toughness.

It has been found by our studies in cutting cast iron with a tool comprised of a sintered silicon nitride body that abrasion wear tends to occur according to a mechanism where the crystal grains fall off due to the presence of a very hardened layer (chilled layer) and sand-containing layer on the surface of the cast iron and the wear of the tool proceeds rapidly. Therefore, it is desired that a material for a cast iron cutting tool have a high fracture toughness and in this respect, the above described tool of the prior art is insufficient in abrasion wear and has a limited usefulness.

To this end, the inventors have made studies to develop a material having an improved transverse rupture strength and improved wear resistance, in particular, a high resistance to the abrasion wearing from a different standpoint from that of the prior art and thus, they have found that a material resistant to abrasion wear can be obtained by composing a silicon nitride sintered body of fine crystal grains and coarse crystal grains. That is, the silicon nitride sintered body is composed of a mixture of fine crystal grains and coarse crystal grains aimed at providing a high strength and hardness by virtue of the fine grains and a high toughness by virtue of the coarse grains, and can be applied to cutting cast iron, thus obtaining good results.

Specifically, the silicon nitride sintered body is composed of crystal grains comprising 50 to 90% by volume of fine hexagonal pillar or columnar crystal grains having a minor axis of at most 1.0 $\mu$m, preferably 0.1 to 1.0 $\mu$m, and 5 to 30% by volume of coarse hexagonal pillar or columnar crystal grains having a minor axis of at least 1.5 $\mu$m, preferably 1.5 to 3.0 $\mu$m. 50% or more of the fine crystal grains having an average minor axis of at most 1 $\mu$m are necessary for achieving a strength for cutting cast iron and 5 to 30% by volume of coarse crystal grains having an average minor axis of at least 1.5 $\mu$m are necessary for increasing the resistance to the abrasion wear. If the amount of the fine crystal grains having a minor axis of at most 1 $\mu$m exceeds 90% by volume, the object of the present invention, i.e. improving abrasion wear resistance, cannot be attained, while if the amount of the coarse crystal grains having a minor axis of at least 1.5 $\mu$m exceeds 30% by volume, the transverse rupture strength is lowered. Furthermore, it is impossible to prepare a sintered body of grains having a minor axis of at most 0.1 $\mu$m from commercially available silicon nitride powders and using grains having a minor axis of at least 3.0 $\mu$m, because the transverse rupture strength is markedly lowered.

In the silicon nitride sintered body of the present invention, preferably 1 to 10% by weight of $Al_2O_3$ and 1 to 10% by weight of $Y_2O_3$ are contained as a sintering aid. Since $\alpha$-silicon nitride has such a property that it is dissolved in a liquid phase to reprecipitate $\beta$-silicon nitride nuclei and tends to be grown as a long hexagonal pillar crystal in the C axis direction of hexagonal system, if more, there can readily be obtained a high strength silicon nitride sintered body in which hexagonal pillar crystals are entangled with each other. By incorporation of the above described sintering aids, $\beta$-silicon nitride tends to grow in a hexagonal pillar form and thus a high strength sintered body can more readily be obtained (Cf. Japanese Patent Publication No. 21091/1973). The reason for limiting the quantities of $Al_2O_3$ and $Y_2O_3$ respectively to 1 to 10% by weight is that in any case, if less than 1% by weight, the effect of addition thereof is little, while if more than 10% by weight, the wear resistance is remarkably lowered.

The silicon nitride sintered body of the present invention can be produced by the use of a silicon nitride powder obtained by the imide decomposition method, or obtained by reducing and nitriding $SiO_2$ powder, or obtained by directly nitriding metallic silicon, as a raw material. In particular, two or more of these powders are preferably used in combination. Since grain growth of the silicon nitride powder takes place during sintering, it is naturally required to use, as a raw material, a silicon nitride powder having a grain size of 1.0 $\mu$m or smaller. The mixed fine and coarse grain structure of the present invention can be prepared by controlling the conditions in the step of sintering these silicon nitride powders, or by mixing a fine powder and coarse powder. As to the raw material powders, there are powders tending to grow readily and being hard to grow, depending upon the history and grain size thereof. As the powder to be used in the present invention, rather than otherwise, the powder hard to grow is preferable since control of the grain size thereof is relatively readily carried out.

When using raw material powders prepared by at least two kinds of methods selected from the group consisting of imide decomposition methods, direct metallic silicon nitriding methods and silica reducing methods, a sintered body or compact can readily be produced in which fine grains and coarse grains of silicon nitride are uniformly dispersed, which is preferred. This is probably due to the fact that the liquid phase temperature and the $\beta$-nuclei forming temperature during transformation of $\alpha$-silicon nitride into $\beta$-type are different, depending upon the history of preparation of the silicon nitride, so that the degrees of the grain growth thereof are different and the mixed fine and coarse grain structure can readily be obtained.

The silicon nitride sintered body of the present invention can be produced by the following methods. Firstly, a silicon nitride powder, $\alpha$-$Al_2O_3$ powder and $Y_2O_3$ powder are mixed in a predetermined proportion in a ball mill, then granulated, press molded and finally sintered in a nitrogen atmosphere under pressure. As occasion demands, the thus resulting sintered product is subjected to a HIP treatment. During the same time, the sintering should preferably be carried out at a temperature of 1700° to 1900° C. and a pressure of 1-300 atm, since if the temperature is lower than 1700° C., the crystal grains are too fine and if the temperature is higher than 1900° C., the crystal grains are too coarse, and since if the pressure is lower than 1 atm, the silicon nitride tends to be decomposed during sintering and if the pressure is higher than 300 atm, such a high pressure is commercially meaningless. The HIP treatment should preferably be carried out at a temperature of 1600° to 1900° C. and a nitrogen pressure of 10 to 3000 atm, since if the temperature is lower than 1600° C., there is little HIP effect and if the temperature si higher than 1900° C., the grain growth is too remarkable, and since if the pressure is lower than 10 atm, there is little pressure effect and if the pressure is higher than 3000 atm, such a high pressure is commercially meaningless.

As illustrated above, the present invention has been the first to succeed in providing a tool comprised of a silicon nitride sintered body which is excellent in both strength and wear resistance, by providing a silicon nitride sintered body comprised of a mixture of fine and coarse grain, the crystal grains being composed of 50 to 90% by volume of hexagonal pillar crystals having a minor axis of at most 1.0 μm and 5 to 30% by volume of hexagonal pillar crystals having a minor axis of at least 1.5 μm. The silicon nitride sintered body of the present invention can favorably be compared with the prior art tools comprised of a sintered silicon nitride body consisting of only fine grains, in particular, in respect of a lengthened life. This contributes largely to the industry.

The present invention will now be illustrated in greater detail by way of examples, but it should be understood that the present invention is not limited thereto.

EXAMPLE 1

A commercially available α-silicon nitride powder prepared by the imide decomposition method was mixed with α-$Al_2O_3$ powder and $Y_2O_3$ powder in proportions as shown in Table 1, Sample Nos. 1 to 6, ball milled, pulverized and then subjected to press molding at a pressure of 1 ton/$cm^2$. The resulting molded products were sintered in a nitrogen atmosphere at a pressure of 5 atm and a temperature of 1800° C. for 2 hours to obtain Sample Nos. 1 to 3, and further subjected to a HIP treatment at a temperature of 1750° C. and a pressure of 1000 atm to obtain Sample Nos. 4 to 6.

The crystal grains of the resulting sintered bodies were examined by subjecting the fractures thereof to measurement by SEM, ion etching or hot NaOH etching.

These sintered bodies (Sample Nos. 1 to 6) were worked into throwaway inserts of JIS SNG 433 by grinding, which were then subjected to the following two cutting tests. For comparison, other throwaway inserts (Sample Nos. 7 to 10) outside the scope of the present invention were subjected to the similar cutting tests.

TABLE 1

| Cutting Test 1 | |
| --- | --- |
| Machining System: | turning |
| Workpiece: | FC 25 ($H_B$ = 180) |
| Cutting Speed: | 600 m/min |
| Feed: | 0.4 mm/rev |
| Cutting Depth: | 1.5 mm |
| Cutting Test 2 | |
| Machining System: | milling |
| Workpiece: | FC 25 ($H_B$ = 200) |
| Cutting Speed: | 200 m/min |
| Feed: | 0.25 mm/edge |
| Cutting Depth: | 2.5 mm |

| Sample No. | Silicon Nitride Powder | $Al_2O_3$ Powder (wt %) | $Y_2O_3$ Powder (wt %) | Silicon Nitride Crystals ≦1 μm | Silicon Nitride Crystals ≧1.5 μm |
| --- | --- | --- | --- | --- | --- |
| 1 | imide decomposition method | 2 | 5 | 60 | 10 |
| 2 | imide decomposition method | 5 | 8 | 70 | 20 |
| 3 | imide decomposition method | 3 | 3 | 80 | 8 |
| 4 | imide decomposition method | 2 | 5 | 65 | 8 |
| 5 | imide decomposition method | 5 | 8 | 75 | 12 |
| 6 | imide decomposition method | 3 | 3 | 85 | 5 |
| 7 | imide decomposition method | 3 | 3 | 70 | 2 |
| 8 | imide decomposition method | 5 | 0 | 80 | 0 |
| 9 | imide decomposition method | 15 | 5 | 20 | 30 |
| 10 | direct Si nitriding method | 5 | 5 | 40 | 25 |

Note:
Sample Nos. 1 to 6-our invention
Sample Nos. 7 to 10-comparison

The test results are shown in Table 2. As is evident from Table 2, the inserts of the present invention (Sample Nos. 1 to 6) each have a longer life than the comparative inserts (Sample Nos. 7 to 10). The insert life was measured at a flank wear width of 0.3 mm.

TABLE 2

| Sample No. | Life of Insert* Test No. 1 (min) | Test No. 2 (min) |
| --- | --- | --- |
| 1 | 34 | 55 |
| 2 | 38 | 48 |
| 3 | 35 | 59 |
| 4 | 35 | 70 |
| 5 | 38 | 60 |
| 6 | 33 | 80 |
| 7 | 20 | 25 |
| 8 | 17 | 23 |
| 9 | 13 | 19 |
| 10 | 16 | 15 |

*measurement of life: at flank wear width of 0.3 mm

EXAMPLE 2

Commercially available α-silicon nitride powders prepared by the imide decomposition method, direct metallic silicon nitriding method and silica reducing method, α-$Al_2O_3$ powder and $Y_2O_3$ powder were used, mixed in proportions as shown in Table 3, Sample Nos. 11 to 15, ball milled, and then subjected to press molding at a pressure of 1 ton/$cm^2$. The resulting molded products were sintered in a nitrogen atmosphere under pressure at a temperature of 1800° C. for 2 hours and further to HIP treatment at a temperature of 1750 ° C. and pressure of 1000 atm to obtain Sample Nos. 11 to 15.

These sintered bodies (Sample Nos. 11 to 15) were worked into throwaway inserts of JIS SNG 433 by grinding, which were then subjected to the similar cutting tests to Example 1.

TABLE 3

| Sample No. | Silicon Nitride Powder* (1) | (2) | (3) | $Al_2O_3$ Powder (wt %) | $Y_2O_3$ Powder (wt %) | Silicon Nitride Crystals ≦1 μm | Silicon Nitride Crystals ≧1.5 μm |
| --- | --- | --- | --- | --- | --- | --- | --- |
| 11 | 70 | 30 | 0 | 2 | 5 | 55 | 30 |
| 12 | 85 | 15 | 0 | 2 | 5 | 60 | 17 |

TABLE 3-continued

| Sample No. | Silicon Nitride Powder* (1) | (2) | (3) | Al₂O₃ Powder (wt %) | Y₂O₃ Powder (wt %) | Silicon Nitride Crystals ≦1 μm | ≧1.5 μm |
|---|---|---|---|---|---|---|---|
| 13 | 95 | 5 | 0 | 2 | 5 | 65 | 10 |
| 14 | 60 | 10 | 30 | 2 | 5 | 62 | 15 |
| 15 | 0 | 20 | 80 | 2 | 5 | 55 | 20 |

Note*
(1) obtained by imide decomposition method
(2) obtained by direct metallic silicon nitriding method
(3) obtained by silica reducing method The test results are shown in Table 4. As is evident from Table 4, the inserts of the present invention (Sample Nos. 11 to 15) obtained by the use of two or more of silicon nitride starting powders differing in their production methods have more excellent cutting properties than the other inserts of the present invention (Sample Nos. 1 to 6) using the single silicon nitride starting powders.

TABLE 4

| Sample No. | Life of Insert* Test No. 1 (min) | Test No. 2 (min) |
|---|---|---|
| 11 | 48 | 63 |
| 12 | 45 | 59 |
| 13 | 38 | 65 |
| 14 | 41 | 61 |
| 15 | 40 | 55 |

*measurement of life: at flank wear width of 0.3 mm

What is claimed is:

1. A cutting tool comprising a $\beta$-$Si_3N_4$ sintered body consisting essentially of 1 to 10% by weight of $Al_2O_3$ and 1 and 10% by weight of $Y_2O_3$ as sintering aids, the remainder consisting essentially of $\beta$-$Si_3N_4$ wherein 50 to 90% by volume of hexagonal pillar crystals have a minor axis of at most 1.0 μm and 5 to 30% by volume of hexagonal pillar crystals have a minor axis of at least 1.5 μm.

2. The cutting tool of claim 1, wherein the silicon nitride used to make the sintered body is obtained by the imide decomposition method.

3. The cutting tool of claim 1, wherein the silicon nitride is prepared by at least two methods selected from the group consisting of the imide decomposition method, direct metallic silicon nitriding method and silica reducing method.

* * * * *